United States Patent [19]
Schumacher

[11] 3,908,392
[45] Sept. 30, 1975

[54] DUAL CONTROL COORDINATING APPARATUS FOR A REFRIGERATOR

[75] Inventor: Frank A. Schumacher, Louisville, Ky.

[73] Assignee: General Electric Company, Louisville, Ky.

[22] Filed: Oct. 30, 1974

[21] Appl. No.: 519,054

[52] U.S. Cl. .................. 62/180; 62/161; 62/267; 62/187
[51] Int. Cl.² ........................................ F25D 17/00
[58] Field of Search ............ 62/161, 267, 187, 180, 62/408

[56] References Cited
UNITED STATES PATENTS

| | | | |
|---|---|---|---|
| 3,126,717 | 3/1964 | Schmacher | 62/186 |
| 3,288,370 | 11/1966 | Mingrone | 62/187 |
| 3,447,747 | 6/1969 | McHale | 62/187 |
| 3,630,046 | 12/1971 | Boor | 62/187 |
| 3,659,429 | 5/1972 | McLean | 62/180 |
| 3,733,841 | 5/1973 | Gelbard | 62/187 |
| 3,793,847 | 2/1974 | Scarlett | 62/187 |

Primary Examiner—William J. Wye

[57] ABSTRACT

An apparatus for providing preselected controlled movement of one control in response to preselected movement of another control of a refrigerator-freezer.

5 Claims, 3 Drawing Figures

U.S. Patent   Sept. 30,1975   3,908,392

DUAL CONTROL COORDINATING APPARATUS FOR A REFRIGERATOR

BACKGROUND OF THE INVENTION

In side-by-side refrigerator-freezers having the freezing compartment separated from the fresh food compartment by a partition, as for example the Model TFF-24 refrigerator manufactured by the General Electric Company in Louisville, Kentucky, a first control wheel is associated with a compressor motor control means of the refrigerator and a second, independent control wheel is associated with an air flow control means of the refrigerator.

In this system, the compressor motor is thermostatically controlled. The thermostat of the motor control means is connected to the first wheel for manually changing the thermostatic setting. The air flow control means is an air damper positioned in an air conduit. The air damper is connected to the second control wheel for manually changing the rate at which air passes from the freezing compartment into the fresh food compartment.

In the operation of this system, the desired fresh food compartment temperature is selected by setting the thermostat by the first control wheel. The temperature of the freezer compartment is controlled by setting the second control wheel which regulates the amount of cold air passing from the freezing compartment into the fresh food compartment.

From a study of the operation, it becomes apparent that at certain settings of the control wheels, there can be a waste of power. An example of such setting would be where the freezing compartment and fresh food control wheels are both set for maximum cold.

At these control settings, the motor controls are demanding the coldest possible temperature for the fresh food compartment. However, this is prevented because the air flow control means is undesirably restricting the amount of air from passing through the ducts from the freezing compartment into the fresh food compartment.

This problem, among others, was solved by the control wheel coordinating apparatus of this invention. The coordinating apparatus interconnects the first and second control wheels in a manner such that both wheels cannot be at their coldest positions at the same time. In the operation of the coordinating apparatus, if one of the control wheels is at its coldest setting, movement of the other wheel to its coldest setting will cause the first-named wheel to move to a warmer setting.

SUMMARY OF THE INVENTION

In accordance with this invention, a first control wheel is connected to motor control means of a refrigerator-freezer and a second control wheel is connected to an air flow control means of the refrigerator-freezer. Each wheel has a groove having first and second ends. The first end of an actuating element is positioned in the groove of the first wheel and the second end is positioned in the groove of the second wheel. The groove ends are at relative positions sufficient to provide preselected controlled movement of one wheel in response to preselected movement of the other wheel.

DETAILED DESCRIPTION OF THE INVENTION

Figure 1:
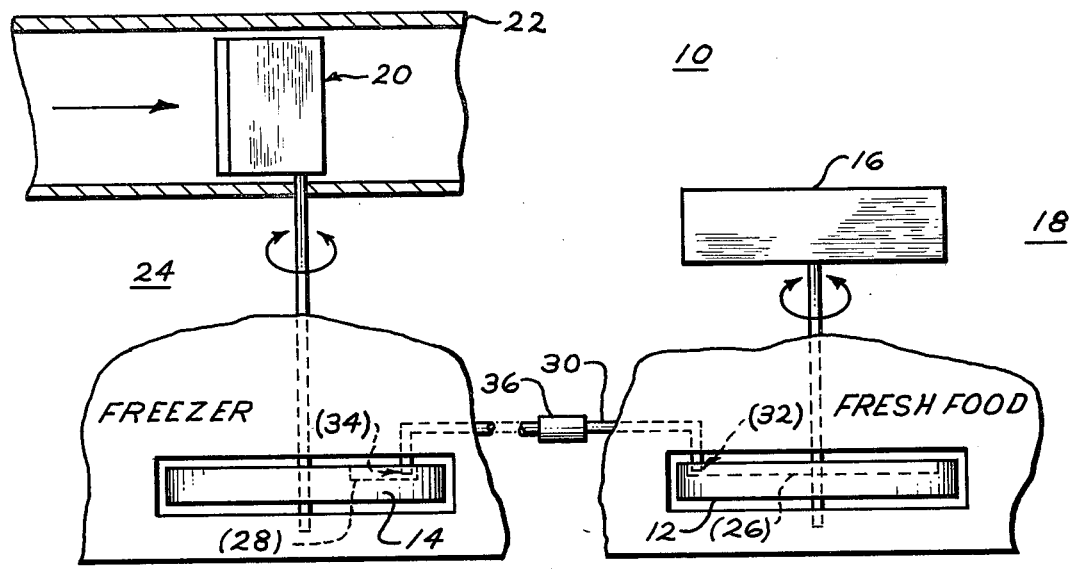
FIG. 1 is a diagrammatic view in partial section of the apparatus of this invention.

In the embodiment of FIG. 1, a control system of a refrigerator 10 has first and second control wheels 12, 14. The first control wheel 12 is connected to the motor control means 16 of the refrigeration system of a refrigerator 10. The motor control means 16 is a thermostat positioned in the fresh food compartment 18 of the refrigerator 10. The second control wheel 14 is associated with an air flow control means 20 of the refrigerator 10. The air flow control means 20 is a movable baffle or valve positioned in a conduit 22 that is utilized for passing air from the freezing compartment 24 into the fresh food compartment 18 of the refrigerator 10.

Figure 2:
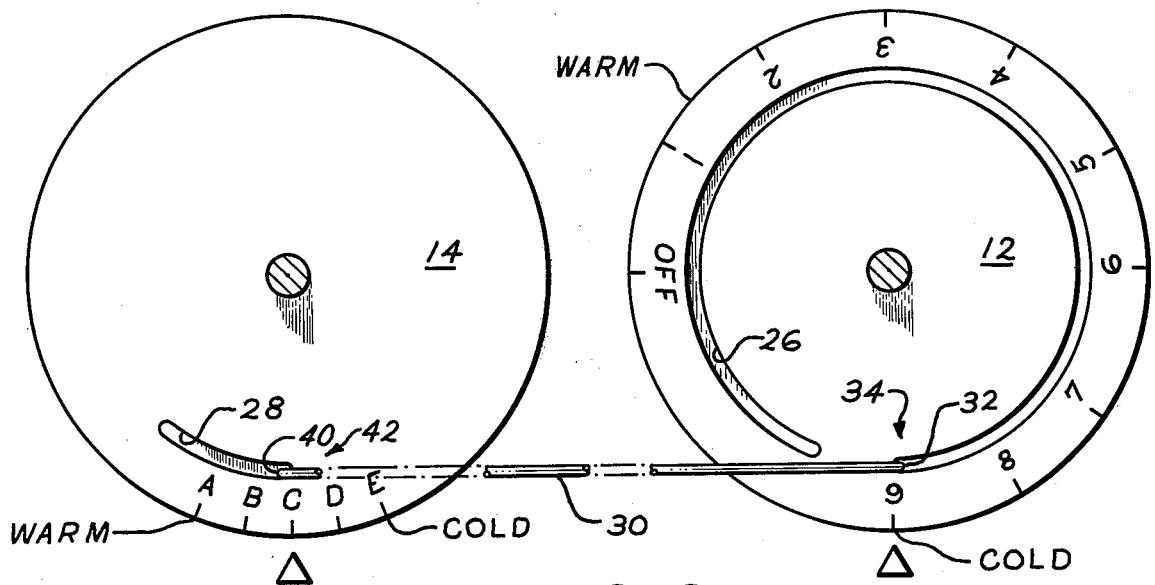
FIG. 2 is a diagrammatic frontal view of the control wheels and actuating element of this invention.

Referring to FIGS. 1 and 2, grooves 26, 28 are provided about the axis of respective control wheels 12, 14. Each groove 26, 28 has first and second ends positioned at preselected locations.

An actuating element 30 has a preselected length and first and second ends 32, 34. The actuating element has its first end 32 positioned in the groove 26 of the first control wheel 12 and the second end 34 positioned in the groove 28 of the second control wheel 14. The actuating element 30 can be, for example, a rod with turned-down ends for riding in the wheel grooves.

It should be understood that the term "control wheels" used herein are example embodiments and do not have to be wheels or of any specific configuration and the term is utilized only for convenience.

In the operation of the apparatus of this invention, the ends of the grooves 26, 28 are relatively positioned for providing preselected control movement of one control wheel in response to preselected control movement of the other wheel.

Referring to FIG. 2, counterclockwise rotation of the first control wheel 12 from the registered numeral 4 to numeral 9, for example, moves the associated motor control means 16 from a warm position for the fresh food compartment 18 to a colder position. Counterclockwise rotation of the second control wheel 14 from registered letter E to letter B, for example, moves the associated air flow control means 20 from a cold position for the freezing compartment 24 to a warmer position.

In one example operation, the first control wheel is set at 5, and the second control wheel is set at E. At these settings, the thermostat 16 is causing the motor to function to maintain the fresh food compartment 18 at a medium temperature and the air control means 20 is nearly closed for maintaining the freezing compartment 24 at its coldest temperature.

An operator then moves the first control wheel 12 from setting 5 to setting 9 to cause the motor to function to maintain the fresh food compartment 18 at its coldest temperature. During movement of the first control wheel 12 from setting 5 to setting 9, the coordinating apparatus functions to move the second control wheel 14 from setting E to setting C.

In another example operation, the first control wheel 12 is set at 9 and the second control wheel 14 is set at B. At these settings, the thermostat 16 is causing the motor to function to maintain the fresh food compartment 18 at its coldest temperature and the air control means 20 at about one-half open for maintaining the freezing compartment 24 at a medium temperature.

An operator then moves the second control wheel 14 from setting B to setting E to move the air control means to nearly closed and maintain the freezing compartment at its coldest temperature. During movement of the second control wheel 14 from setting B to setting E, the coordinating apparatus functions to move the first control wheel 12 from setting 9 to a setting between numerals 7 and 8.

It can therefore be seen that the apparatus of this invention functions to prevent the control wheels 12, 14 from both being at their coldest settings. It can also be seen that if one of the control wheels is positioned at the lower or medium position, movement of the other control wheel will not cause the first-named control wheel to move from its lower or medium setting.

For example, if the first control wheel is positioned at any position between 1 and 7, the second control wheel 14 can be moved between settings A to E without causing first control wheel 12 to be moved. Also, if the second control wheel 14 is positioned at any position between A and C, the first control wheel 12 can be moved between settings 1 to 9 without causing the second control wheel 14 to be moved.

One skilled in the art can easily determine the position of the groove ends of each control wheel after the control wheels have been positioned and it is determined how much responsive rotation is desired.

Referring to FIG. 1, a turnbuckle 36 or other device can be associated with the actuating element 30 for changing the length of said element 30. By changing the length of the actuating element 30, one can selectively alter the amount one of the control wheels rotates in response to rotation of the other control wheel.

Figure 3:
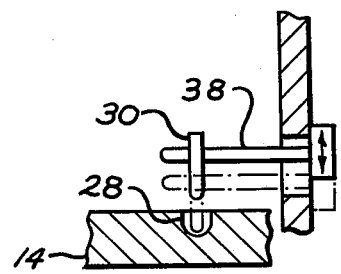
FIG. 3 is a diagrammatic partially sectioned view of a de-activation means of this invention.

Referring to FIG. 3, a latch 38 can be associated with one end of the actuating element for removing the actuating element end from the associated groove and thereby deenergizing the apparatus of this invention.

By so providing the latch 38, the operator can, under certain desired conditions, drive the freezing compartment to extremely cold conditions.

Other modifications and alterations of this invention will become apparent to those skilled in the art from the foregoing discussion, and it should be understood that this invention is not to be unduly limited thereto.

What is claimed is:

1. In a control system of a refrigerator-freezer having a first control wheel connected to a compressor motor control means and a second control wheel connected to an air flow control means, the improvement comprising:

each of said control wheels having a groove extending about the axis of said control wheel; and an actuating element having first and second ends, said first end being positioned in the groove of the first wheel and said second end being positioned in the groove of the second wheel, said grooves having groove ends positioned relatively one to the other for preselected movement of one wheel and its associated control means in response to movement of the actuating element by the other wheel and its associated control means.

2. Apparatus, as set forth in claim 1, wherein the grooves ends are at locations sufficient for providing movement of one control means from an upper portion of its operating range in response to movement of the other control means into an upper portion of its operating range.

3. Apparatus, as set forth in claim 1, wherein the groove ends are at locations sufficient for preventing movement by the actuating element of one control means when said one control means is positioned at a location other than the upper portion of its operating range.

4. Apparatus, as set forth in claim 1, including means for changing the length of the actuating element.

5. Apparatus, as set forth in claim 1, including means for removing the actuating element from within one of the grooves and maintaining said element spaced from said groove.

* * * * *